United States Patent [19]

Krishnamurthy et al.

[11] Patent Number: 4,650,780

[45] Date of Patent: * Mar. 17, 1987

[54] REACTIVATION OF NOBLE METAL-CONTAINING CATALYST MATERIALS

[75] Inventors: Sowmithri Krishnamurthy, Glen Mills, Pa.; Quang N. Le, Cherry Hill; Stephen S. Wong, Medford, both of N.J.

[73] Assignee: Mobil Oil Corporation, New York, N.Y.

[*] Notice: The portion of the term of this patent subsequent to Nov. 26, 2002 has been disclaimed.

[21] Appl. No.: 797,547

[22] Filed: Nov. 13, 1985

Related U.S. Application Data

[63] Continuation-in-part of Ser. No. 604,268, Apr. 26, 1984, Pat. No. 4,555,495.

[51] Int. Cl.$^4$ .................... B01J 29/38; C10G 47/18; C10G 39/095
[52] U.S. Cl. .................................. 502/50; 208/111; 208/140; 502/52
[58] Field of Search ...................... 502/30, 31, 34, 50, 502/52, 53, 38; 208/140

[56] References Cited

U.S. PATENT DOCUMENTS

| | | | |
|---|---|---|---|
| 3,287,256 | 11/1966 | Young | 208/111 |
| 3,617,523 | 10/1969 | Spurlock | 502/52 |
| 3,660,271 | 5/1972 | Keith | 208/139 |
| 3,661,768 | 5/1972 | Davis, Jr. et al. | 208/139 |
| 4,033,898 | 7/1977 | Jacobson et al. | 502/50 |
| 4,377,468 | 3/1983 | La Pierre et al. | 208/111 |
| 4,482,637 | 11/1984 | Buss et al. | 502/517 |
| 4,507,397 | 3/1985 | Buss | 502/38 |
| 4,555,495 | 11/1985 | Krishnamurthy | 502/50 |

FOREIGN PATENT DOCUMENTS 2030321 12/1970 Fed. Rep. of Germany ........ 502/50

*Primary Examiner*—P. E. Konopka
*Attorney, Agent, or Firm*—A. J. McKillop; M. G. Gilman; L. P. Hobbes

[57] ABSTRACT

A coke-deactivated noble metal-containing catalyst is sulfided with a sulfiding agent, e.g., $H_2S$ in $H_2$, then coke is burned from the sulfided catalyst by contacting the catalyst with oxygen, optionally in the presence of sulfur dioxide, and then the catalyst is reduced with a reducing agent, e.g., $H_2$. The process permits burning off coke while avoiding excessive agglomeration of the noble metals on the catalyst.

22 Claims, No Drawings

REACTIVATION OF NOBLE METAL-CONTAINING CATALYST MATERIALS

This case is a continuation-in-part of U.S. patent application Ser. No. 604,268, filed Apr. 26, 1984, now U.S. Pat. No. 4,555,495, incorporated herein by reference.

The invention relates to a process of reactivating catalysts. In particular, it relates to the reactivation of noble metal-containing zeolite catalysts which have been deactivated by coke build-up. Catalysts which may be reactivated by the process of the present invention include those that have become deactivated during hydrocarbon hydroprocesses, such as the reforming or catalytic dewaxing of hydrocarbon feedstocks.

Reactivation of platinum catalysts in reforming is known. Chlorine and oxygen catalyst reactivation are particularly well-known. U.S. Pat. No. 2,906,702 to Brennan et al discloses a method of restoring an alumina-supported platinum catalyst after deactivation occurring during the reforming of hydrocarbons. Deactivated platinum-alumina catalyst is contacted with a gaseous chlorine, fluorine, or other halogen or halogen-affording substance at an elevated temperature. U.S. Pat. No. 3,134,732 to Kearby et al teaches reactivating noble metal catalyst supported on alumina by contacting the catalyst with halogen-containing gas, stripping excess halogen therefrom, and reducing the resulting catalyst with a hydrogen-containing gas. In this disclosure, the agglomerated metal is present on the surface of the alumina as small crystallites.

Regeneration of noble metal-loaded zeolite catalysts required certain procedural modifications to regain the activity of the metal. U.S. Pat. No. 3,986,982 to Crowson et al treats deactivated platinum group metal-loaded zeolites by contacting them with a stream of an inert gas containing from 0.5 to 20 percent volume of free oxygen and from 5 to 500 ppm volume of chlorine as chlorine, HCl, or an organic chlorine-containing material. The resulting catalyst is purged to remove residual oxygen and chlorine and then reduced in hydrogen at 200° to 600° C.

The treatment of regenerated noble metal-containing catalysts with sulfur compounds is also known. U.S. Pat. No. 3,661,768 to Davis, Jr., et al. describes regenerating a bimetallic reforming catalyst such as platinum-rhenium on alumina and then contacting the catalyst with hydrogen sulfide to convert platinum to platinum sulfide. Prior to sulfiding, the catalyst is contacted with chlorine and steam to effect chlorination.

All of the above treatments require certain precautions owing to the corrosive nature of the halogens used. In addition, certain halogen materials employed in these processes add significantly to the cost of catalyst regeneration. To avoid the drawbacks associated with halogen use, it would be advantageous to reactivate catalysts in the absence of halogens. However, when deactivating coke present on a catalyst material is exposed to an oxidizing atmosphere consisting of oxygen and an inert gas, such as nitrogen, substantially all of the noble metal present on the catalyst becomes catalytically inactive.

A way has now been discovered to overcome these drawbacks.

Accordingly, the present invention provides a process for regenerating a coke-deactivated, noble metal containing catalyst which comprises removing coke from the catalyst by contacting the catalyst with an oxygen-containing gas and oxidizing the coke and then reducing the decoked catalyst with a reducing gas characterized by sulfiding the deactivated catalyst prior to coke removal.

The present invention provides a regenerated catalyst of enhanced activity which retains a substantial portion of its noble metal in a dispersed form. The process comprises sulfiding the aged catalyst, oxidizing the coke on the sulfided catalyst material with oxygen, optionally in the presence of sulfur dioxide and then reducing the catalyst with hydrogen.

Suitable sulfiding agents for the purposes of the present invention include hydrogen sulfide and compounds which decompose to yield $H_2S$, e.g., light mercaptans such as carbon disulfide and dimethyl sulfide, and compounds or substances which effectively sulfide the catalysts, e.g., a naphtha fraction spiked with 0.1 to 10 wt % disulfides. Hydrogen sulfide is preferred because it is very active and readily available in refineries. Preferably, the sulfiding agent is combined with hydrogen to form a mixture containing 0.1 to 10 volume percent sulfiding agent, e.g., hydrogen sulfide, preferably about 1 to 2 volume percent. Suitable conditions for sulfiding include temperatures of about 300° to 500° C., preferably about 350° to 450° C., say about 400° C., typically 350° to 400° C. Pressures may range from slightly above or below atmospheric to 1000 psig, preferably about 50 to 600 psig. Preferably, the deactivated catalyst is sulfided at least until "breakthrough" of the sulfiding agent at the outlet of the sulfiding vessel, i.e., the sulfiding agent is detected in the sulfiding vessel effluent.

The sulfide addition step preferably adds 0.005 to 10 wt. % sulfur, calculated on an elemental sulfur basis, prior to regeneration, with 0.01 to 3 wt. % sulfur addition giving very good results. In many instances, adding as little as 0.1 or 0.2 wt. % sulfur is enough.

The coke on sulfided catalyst is burned at moderate temperatures and oxygen concentrations. Temperatures of about 100° to 500° C., preferably about 400° to 450° C., and pressures of about 1 to 1000 psig, preferably about 50 to 600 psig may be used. Mild oxidizing conditions minimize alteration in the crystal structure of the zeolite being treated. High temperatures and high oxygen concentrations favor coke burn off. Usually the temperature of the regeneration gas, and the oxygen concentration, will be set so that temperature in the catalyst bed during regeneration will not exceed 500° C., and preferably not above 400° to 450° C.

Sulfided catalyst is contacted with a gas stream containing oxygen and, optionally, sulfur dioxide. Generally, the gas stream may contain 0.5 to 20, and preferably 1 to 10 volume percent $O_2$ and optionally, 100 ppm to 2 volume percent $SO_2$, most preferably about 0.5 to 7 volume percent $O_2$ and about 0.05 to 1 volume percent $SO_2$. The $SO_2$ prevents or reduces agglomeration of the noble metals during the removal of coke.

Dispersion of the noble metals can be measured by hydrogen chemisorption, e.g., Temperature Programmed Desorption (TPD) of hydrogen. This technique indicates the extent of noble metal agglomeration. Details of this analytical technique may be found in "The Stoichiometry of Hydrogen and CO Chemisorption of Ir/$\gamma$-$Al_2O_3$", Vol. 78, Journal of Catalysis, pp. 319-326, Krishnamurthy et al., (1982). Alternatively, such dispersion can be measured by X-ray line broadening techniques which detect the weight percent of noble metal agglomerates of greater than 50 angstroms.

The catalyst is reduced after the coke burn. Any suitable reducing agent, preferably hydrogen, may be used. The catalyst contacts the reducing agent at about 300° to 500° C., preferably 350° to 450° C. for a time sufficient to reduce the metal, usually 1 to 10 hours, preferably about 3 to 5 hours. Where hydrogen is used, reduction is usually carried out at about 1 to 1000 psig, preferably 50 to 600 psig. Hydrogen sulfide may be employed as a reducing agent in conjunction with or as a substitute for hydrogen.

The present invention can be used with any noble metal containing catalyst, either on an amorphous support or on a zeolite containing support.

Many reforming catalysts consist of 0.1 to 2 wt. % noble metal on alumina or other support. Typically, these catalysts contain 0.1 to 1% halogen. Platinum is almost always present, either alone or in combination with other metals such as rhenium or iridium. Many of these reforming catalysts are sulfided before use in the reforming process. Sulfiding of fresh or regenerated, reforming catalysts is not equivalent to adding more sulfur to the catalyst after it has been at least partially deactivated but before it has been regenerated.

The process of the present invention is especially useful when the noble metals are on a zeolite containing support.

The zeolites which may be rejuvenated by the process of the present invention include large pore zeolites such as Zeolite Y, zeolite beta, ZSM-3, ZSM-4, ZSM-18 and ZSM-20, as well as zeolites having a constraint index of about 1 to 12 and silica to alumina mole ratio greater than about 12. Examples of such materials include ZSM-5, ZSM-11, ZSM-5/ZSM-11 intermediates, ZSM-12, ZSM-23, ZSM-35, ZSM-38, ZSM-48 and other similar materials.

Zeolite Y is described in greater detail in U.S. Pat. No. 3,130,007. The entire description contained within this patent, particularly the X-ray diffraction pattern of therein disclosed Zeolite Y, is incorporated herein by reference.

Zeolite beta is described in U.S. Pat. No. 3,308,069. That description, including the X-ray diffraction pattern of zeolite beta, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. No. 4,229,424. That description, and in particular the X-ray diffraction pattern of said compositions disclosed therein, is incorporated herein by reference.

ZSM-12 is described in U.S. Pat. No. 3,832,449. That description, and in particular the X-ray diffraction pattern disclosed therein, is incorporated herein by reference.

ZSM-18 is described in U.S. Pat. No. 3,950,496. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

ZSM-23 is described in U.S. Pat. No. 4,076,842. The entire content thereof, particularly the specification of the X-ray diffraction pattern of the diclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,234,231, the entire contents of which is incorporated hereby by reference.

Particularly preferred zeolites for the purposes of the present invention are those which have silica-to-alumina mole ratios greater than 20, preferably greater than 70 or 100.

The catalyst treated by the process of the present invention contains at least one noble metal such as platinum, palladium, iridium, osmium, rhodium, rhenium and ruthenium or mixtures thereof in amounts ranging from 0.05 to 5 wt %, preferably 0.1 to 2 wt %, most preferably, 0.3 to 0.9 wt %. These noble metals are generally associated with and supported on a zeolite catalyst. The process may also be used to regenerate multimetallic catalysts which contain one of the above noble metals and another metal selected from Groups IB, IVB, VIIA, or VIII of the Periodic Table. The zeolite catalyst treated can be binder free or it may contain an inorganic oxide binder such as alumina, silica, silica-alumina, magnesia, titania, zirconia, or thoria.

This invention will be better understood by reference to the following examples.

EXAMPLE 1

10 grams of a catalyst comprising a support of zeolite beta and alumina (65/35 wt. % ratio) and 0.59 wt. % Pt was coked and deactivated. The deactivated catalyst was sulfided to breakthrough with $H_2$ containing 2 volume percent $H_2S$ at 400° C. and a pressure just slightly above atmospheric at the inlet to the reactor. The sulfided catalyst was then contacted with a gas containing 96.3 volume percent $N_2$, 3 volume percent $O_2$ and 0.7 volume percent $SO_2$ at 400° to 450° C. for 0.5 hours to burn off the coke and thereafter reduced in $H_2$ at 450° C. Gas flows were roughly constant in each step, about 1.4 cc/second of gas, at standard conditions. The catalyst was measured by hydrogen chemisorption for platinum dispersion. The regenerated catalyst had a platinum dispersion of 0.33 compared wih a dispersion of 0.57 for fresh catalyst.

EXAMPLE 2

A 10 g sample of the coked catalyst of Example 1 was decoked, using the same apparatus and procedure, with 97 volume percent $N_2$ and 3 volume percent $O_2$ at 400° to 450°0 C. The decoked catalyst was then reduced for one hour at 450° C. in hydrogen. Platinum dispersion, as measured by hydrogen chemisorption, was 0.

A comparison of Examples 1 and 2 indicates that the reactivation process of the present invention is effective in retaining a significant portion of the initial Pt dispersion of a catalyst, which would otherwise be lost by conventional regeneration treatment.

EXAMPLE 3

A 10 g sample of the coked catalyst of Example 1 was sulfided, using the same apparatus and procedure as in Example 1, in a glass reactor to breakthrough with a mixture of 2% $H_2S/H_2$ at 400° C. The sulfided catalyst was decoked with 97 vol. % $N_2$ and 3 vol. % $O_2$ at 400° C. to 450° C. The catalyst was then reduced for one hour at 450° C. The regenerated catalyst had a platinum dispersion, by hydrogen chemisorption, of 0.1 compared with a dispersion of 0.57 for a fresh catalyst.

EXAMPLE 4

This test was done in a high pressure test reactor, at conditions closer to those likely to be experienced in a commercial plant. One hundred cc of a fresh 0.6 weight percent platinum on steamed 65 wt. % zeolite beta/35 wt. % alumina catalyst was presulfided with 2 volume percent $H_2S/98$ volume percent $H_2$ at 400 psig at 370° C. for two hours until $H_2S$ breakthrough. Gas flows in this, and succeeding steps, was 28.3 dm³/s, at standard conditions (1.0 standard cubic foot per hour). The temperature was then increased to 430° C. (800° F.) and the feed changed to 0.5 volume percent $H_2S/99.5$ volume percent $H_2$. These conditions were held for two hours until $H_2S$ breakthrough. The catalyst was then purged with $N_2$ at 230° C. (450° F.) for six hours. Platinum agglomeration was measured by X-ray line broadening analysis to detect platinum agglomerates greater than about 50 to 75 angstroms.

Coke was then burned at 100 psig, in 1 to 7% oxygen in nitrogen and a maximum burn temperature of 450° C. Platinum agglomeration was then measured.

The process was repeated except a catalyst containing 15 weight percent coke was substituted for the fresh catalyst.

Finally, both catalysts were again treated by the above process except that $H_2$ was substituted for the $H_2S/H_2$ mixture.

The results are given in the following Table.

| Catalyst | Pt. X-ray peak area, % | |
|---|---|---|
| | before burn | after burn |
| Fresh catalyst | | |
| $H_2S/H_2$ treated | 2 | 5 |
| $H_2$ treated | 5 | 72 |
| Coked catalyst | | |
| $H_2S/H_2$ treated | 2 | 25 |
| $H_2$ treated | 2 | 47 |

These results show that catalysts (both fresh and coked) treated with $H_2S/H_2$ before oxidative regeneration showed drastic reduction in the extent of metal agglomeration.

It is claimed:

1. A process for regenerating a coke-deactivated, noble metal containing catalyst comprising a zeolite which comprises removing coke from the catalyst by contacting the catalyst with an oxygen-containing gas and then reducing the decoked catalyst with a reducing gas, said process being characterized by sulfiding the coke-deactivated catalyst with a sulfiding gas containing 0.1 to 10 volume percent $H_2S$ at least until breakthrough of the sulfiding gas prior to coke removal.

2. A process of claim 1 wherein the sulfiding temperature is about 300° to 500° C. and the pressure is atmospheric to 1000 psig.

3. The process of claim 1 wherein the oxygen-containing gas contains 100 ppm to 2 volume % sulfur dioxide.

4. The process of claim 3 wherein the oxygen-containing gas contains about 0.05 to 1 volume percent sulfur dioxide and about 0.5 to 7 volume percent oxygen.

5. The process of claim 1 wherein sulfiding is effected by contacting deactivated catalyst with 2 volume percent $H_2S/98$ volume percent $H_2$ mixture followed by contact with a 0.5 volume percent $H_2S/99.5$ volume percent $H_2$ mixture.

6. The process of claim 1 wherein the sulfiding step adds 0.005 to 10 wt. % sulfur, calculated on an elemental sulfur basis, to the catalyst.

7. The process of claim 1 wherein the sulfiding step adds 0.01 to 3 wt. % sulfur, calculated on an elemental sulfur basis, to the catalyst.

8. The process of claim 1 wherein the framework silica to alumina mole ratio of said zeolite is at least about 20.

9. The process of claim 1 wherein the framework silica to alumina mole ratio of said zeolite is at least about 70.

10. The process of claim 1 wherein the framework silica to alumina mole ratio of said zeolite is at least about 100.

11. The process of claim 1 wherein said catalyst material contains a zeolite having a constraint index ranging from about 1 to 12 and a silica to alumina mole ratio of at least about 12.

12. The process of claim 1 wherein said catalyst material contains a zeolite selected from the group consisting of ZSM-5, ZSM-5/ZSM-11 intermediate, ZSM-11, ZSM-12, ZSM-23, ZSM-35, ZSM-38 and ZSM-48.

13. The process of claim 1 wherein said catalyst material contains a zeolite selected from the group consisting of mordenite, zeolite beta, Zeolite Y, ZSM-3, ZSM-4, ZSM-18 and ZSM-20.

14. The process of claim 1 wherein said zeolite is zeolite beta.

15. The process of claim 1 wherein said zeolite is ZSM-5.

16. The process of claim 1 wherein said zeolite contains a metal selected from the group consisting of platinum, palladium, iridium, osmium, rhodium, rhenium and ruthenium.

17. The process of claim 1 wherein said zeolite contains about 0.3 to 0.9 weight percent platinum group metal.

18. The process of claim 1 wherein said catalyst contains an inorganic oxide binder.

19. The process of claim 18 wherein said binder is selected from the group consisting of alumina, silica, silica-alumina, magnesia, titania, zirconia and thoria.

20. The process of claim 19 wherein said binder is alumina.

21. The process of claim 19 wherein said binder is silica.

22. The process of claim 19 wherein said binder is silica-alumina.

* * * * *